Patented Feb. 18, 1941

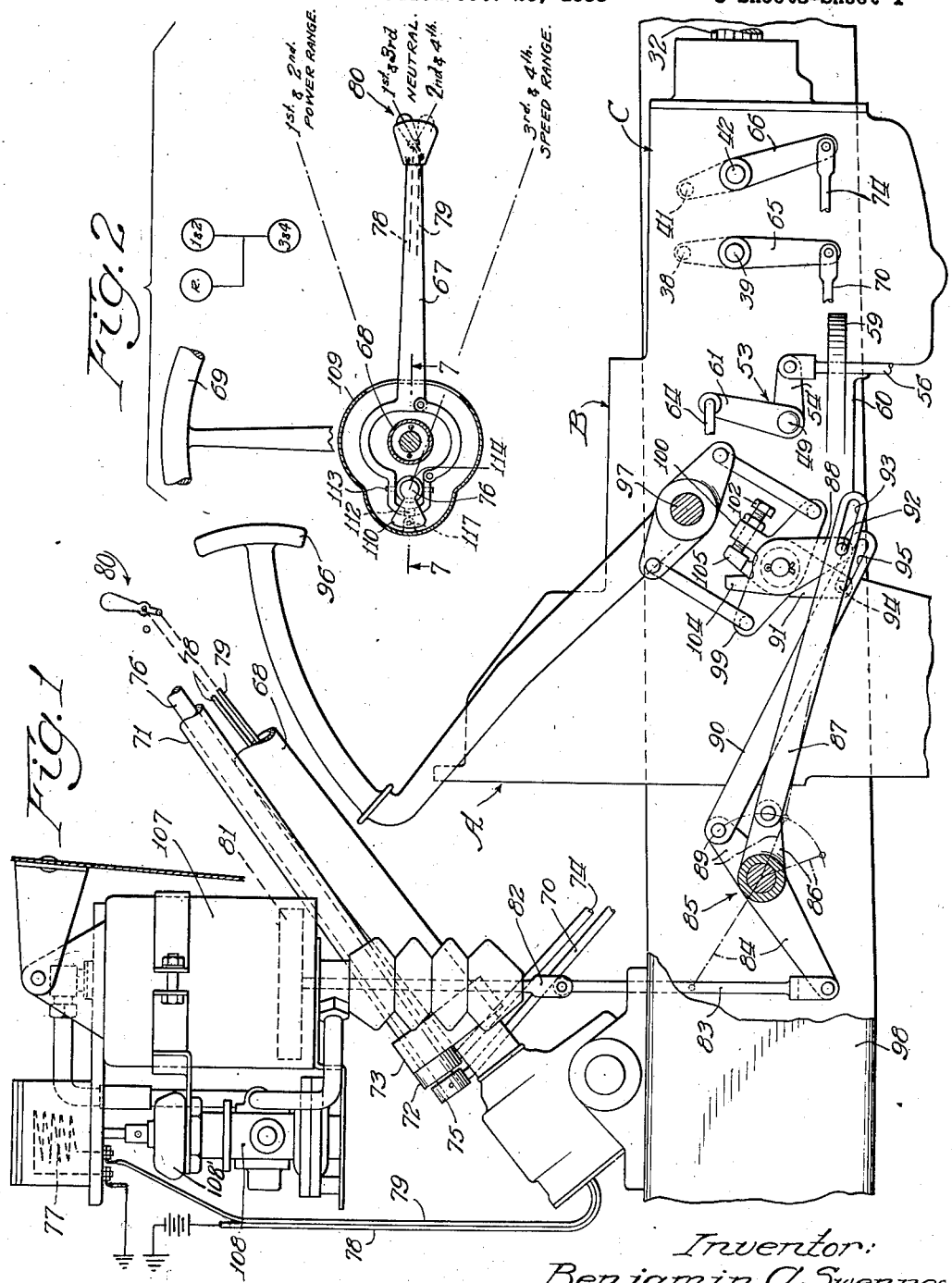

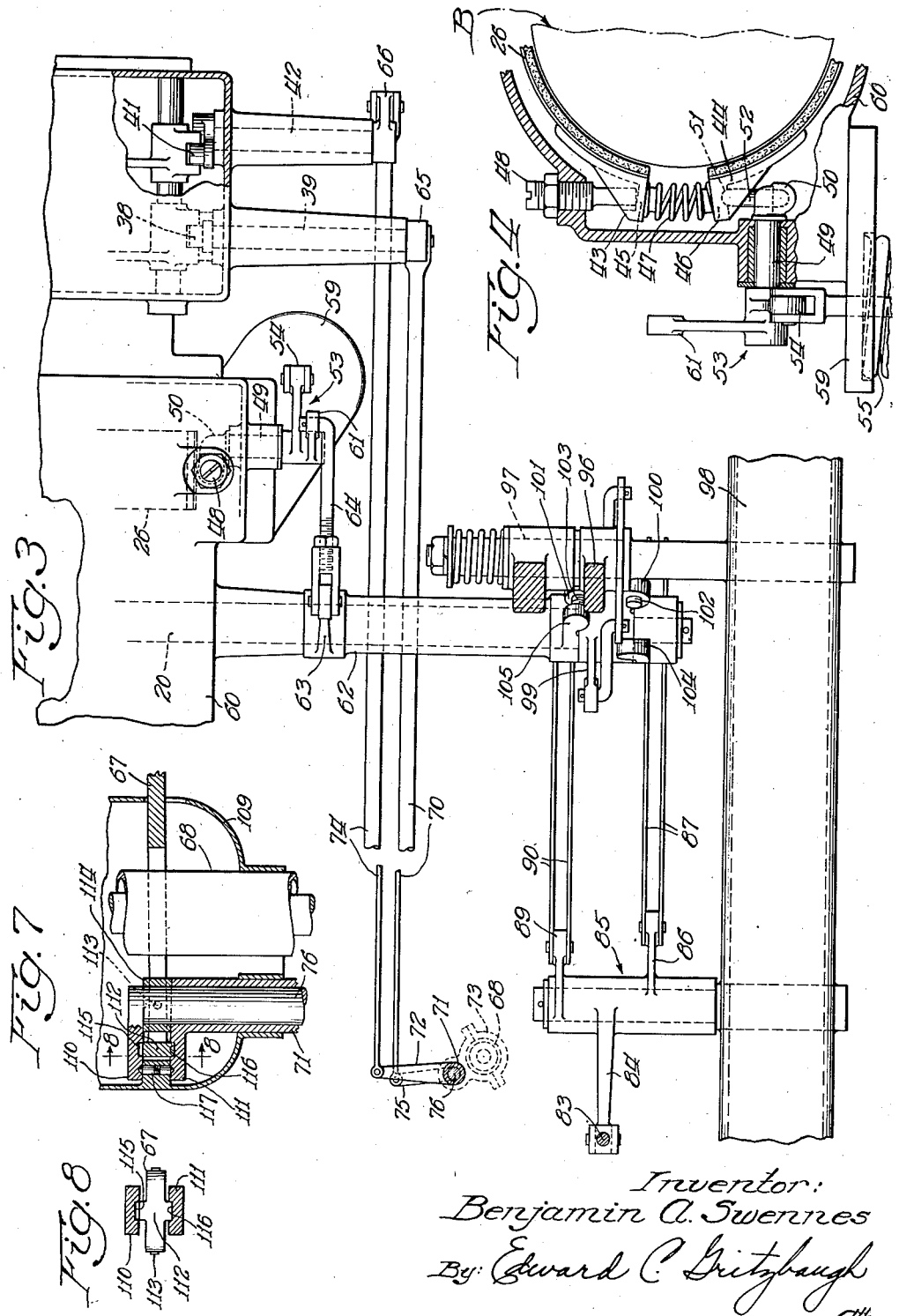

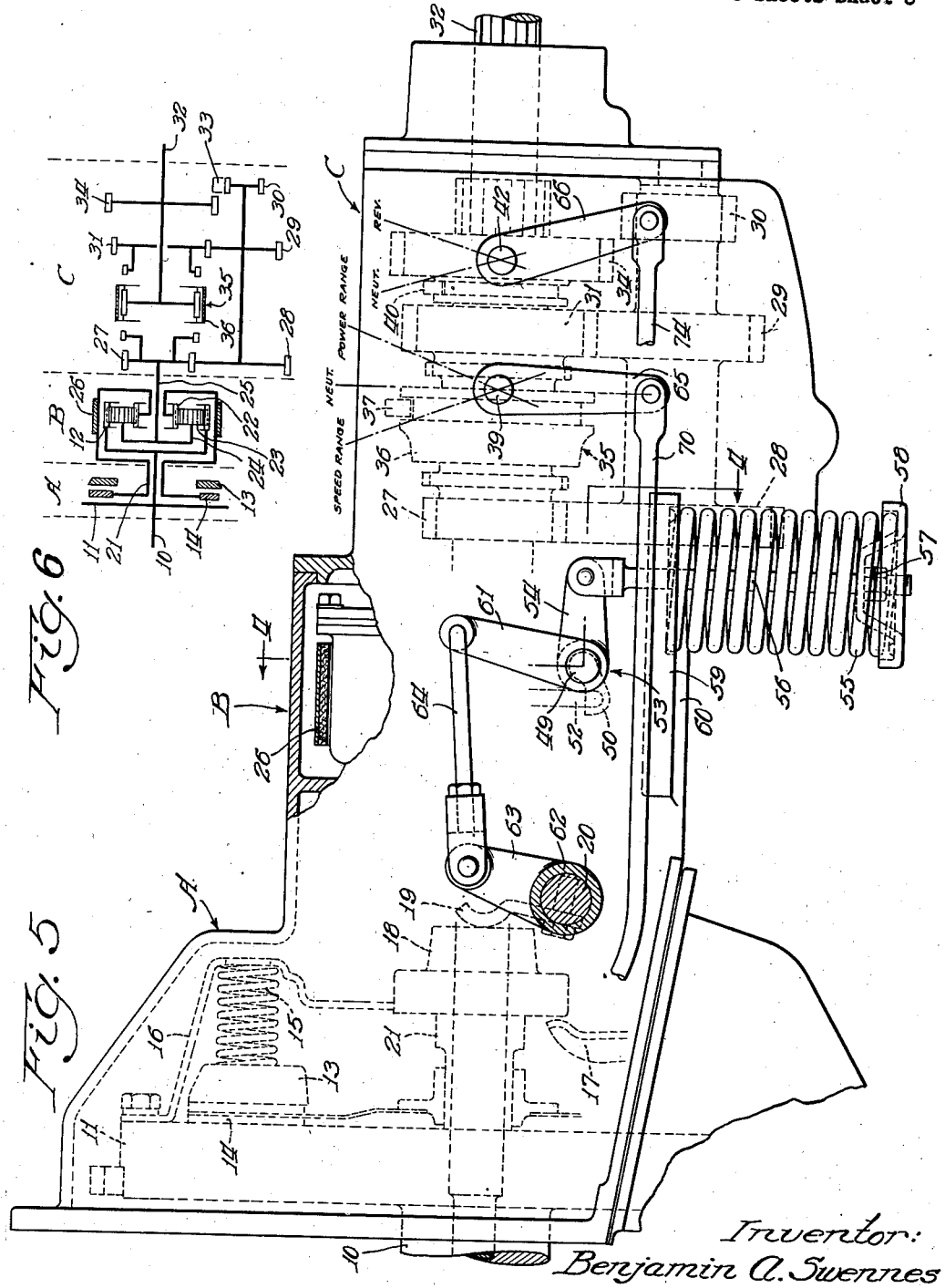

2,231,966

UNITED STATES PATENT OFFICE 2,231,966

TRANSMISSION CONTROL

Benjamin A. Swennes, Rockford, Ill., assignor to Borg-Warner Corporation, Chicago, Ill., a corporation of Illinois Application October 28, 1938, Serial No. 237,478

13 Claims. (Cl. 192—3.6)

This invention relates to a control for a transmission mechanism having a plurality of predetermined speed ratios and one or more neutral settings.

The object of this invention is to provide a control for a variable transmission wherein said control is partly power-driven and partly manually driven.

Another object of this invention is to provide a transmission control, which will permit of said transmission being conditioned for neutral operation without disturbing the setting of said control.

Another object of this invention is a control for a transmission wherein a portion of said control is power-driven and wherein said portion is independent of fluctuation in the power means, such fluctuation including a total cessation of power after the control has been set by said power means.

Yet another object of this invention is a control for a transmission, a portion of which control is power-driven, said power-driven portion being such that changes in the transmission ratio are made smoothly and quietly.

These and other objects and features of this invention will become apparent from the following description, when taken together with the accompanying drawings, which form a part thereof and in which:

Fig. 1 is a side elevation of the novel control mechanism;

Fig. 2 is a plan view of the control lever for the mechanism and a schematic diagram of the position of said control lever;

Fig. 3 is a plan view of the control mechanism;

Fig. 4 is a fragmentary elevation partly in section showing the connection of the control mechanism to the transmission;

Fig. 5 is an enlarged elevation partly in section of a transmission adapted to use the novel control mechanism;

Fig. 6 is a schematic diagram of the various gears and shiftable elements in the transmission of Fig. 5; and Figs. 7 and 8 are side and front elevations in section of portions of the connecting mechanism between the control lever and the operative portions of the transmission.

The transmission used here to illustrate the operation of the novel control mechanism of this invention is described and claimed in detail in my co-pending application Serial No. 237,388, filed October 28, 1938.

In its preferred form, this invention comprises a system of levers, a portion of which is directly operated by a power device and the remainder of which is directly under the control of a manually operable lever. The power device is preferably a cylinder and piston operated by the vacuum of the gasoline engine with which the transmission is to be used. The cylinder is controlled by a valve, which in turn, is operated by a solenoid. A switch located on the manually operable lever controls the circuit through the solenoid. A foot-operated lever corresponding to the clutch pedal of the present-day car is connected to the system of levers in such a manner as to enable the operator to place the transmission in neutral without disturbing the setting of either the power device or the manually operable control lever.

Before detailing the description and operation of the control mechanism a brief outline of the function and operation of the transmission illustrated here will be given.

Referring now to Figs. 5 and 6, the transmission may be divided broadly into three sections A, B and C. Section A contains the fly-wheel and disc clutch, section B contains a planetary gear set, and section C is a counter-shaft type of speed-reducing transmission which includes a means for obtaining reverse.

Driving shaft 10 is connected to a fly-wheel 11 in section A and also to a ring-gear 12 in section B, so as to drive fly-wheel 11 and ring-gear 12 simultaneously. Cooperating with fly-wheel 11 is a pressure plate 13 and a driven friction disc 14 which with pressure plate 13 and fly-wheel 11 constitute a friction disc clutch of the usual form. Said pressure plate 13 is normally urged against friction disc 14 by means of compression springs 15, which react against clutch housing 16. Clutch release fingers 17 may be rocked by collar 18 whereby to release said driven disc 14. Collar 18 is moved axially by yoke 19 rigidly connected to shaft 20. Thus, rocking shaft 20 counter-clockwise will release the clutch, and rocking shaft 20 clockwise will cause the clutch to become engaged.

Driven clutch disc 14 is drivingly splined to a hollow shaft 21, which in turn is connected to sun-gear 22 in section B. Between ring-gear 12 and sun-gear 22 are a plurality of planet gears 23 mounted on a carrier 24 which drives intermediate shaft 25. Sun-gear 22 is provided with a brake 26 by which it may be held against rotation.

It will be apparent thus far that when clutch disc 14 is driven, brake 26 must be released, and conversely when brake 26 is engaged to hold sun-gear 22, clutch disc 14 must be released. Brake 26 and clutch disc 14 are, therefore, mutually exclusively operable.

The right hand end (Fig. 6) of intermediate shaft 25 is provided with a gear 27, which meshes with the first gear 28 of a counter-shaft gear cluster 28, 29 and 30. Gear 29 meshes with a gear 31 loosely mounted on driven shaft 32. Gear 30 meshes with an idler 33 which in turn is engageable by sliding gear 34 to obtain reverse drive through the transmission. A synchronizer 35 is adapted selectively to connect either gear 27 or gear 31 to driven shaft 32, whereby to secure a direct drive and a reduced speed drive, respectively, through section C of the transmission. The shiftable element 36 of synchronizer 35 is controlled by a yoke 37 which is connected through a crank pin 38 to a rock shaft 39. Gear 34 is likewise controlled by a yoke 40, which in turn is connected through a crank pin 41 to rock shaft 42. Thus, rocking shaft 39 counter-clockwise from neutral position causes gear 27 to be connected to output shaft 32 to secure a direct drive through section C, and rocking shaft 39 counter-clockwise from neutral position connects gear 31 to driven shaft 32 whereby to secure a reduced drive through said section C. Rocking shaft 42 counter-clockwise will disengage gears 34 and 33 and will leave section C in neutral so far as these gears are concerned. Rotating rock shaft 42 clockwise will engage gears 33 and 34, thereby conditioning section C for reverse operation.

The various gear trains through the transmission of Figs. 5 and 6 will now be described.

The transmission as a whole comprises two gear sets, each of which is capable of giving one reduced speed and one direct connection. The transmission, therefore, will give four speeds forward and two speeds in reverse. For first speed both sections B and C are operated to give a reduction through each. Clutch A, therefore, is disengaged, brake 26 is engaged, and shaft 39 is rocked clockwise to connect gear 31 with driven shaft 32. The gear train for first speed runs from drive shaft 10, ring-gear 12, planet gears 23, planet gear carrier 24, intermediate shaft 25, and gears 27, 28, 29 and 31 through synchronizer 35 to driven shaft 32.

For second speed, section B is locked in one-to-one ratio, and section C is left as for first speed. Section B is locked in one-to-one ratio by releasing brake 26 and engaging clutch disc 14, so that both sun-gear 22 and ring-gear 12 are driven at the same speed. When this condition obtains, intermediate shaft 25 rotates at the same speed as drive shaft 10, and there is produced just the reduction obtainable through section C.

For third speed section B is operated at its reduced speed, and section C is locked in one-to-one ratio. Thus, clutch disc 14 is released, brake band 26 is again applied to arrest the rotation of sun-gear 22, and shaft 39 is rocked counter-clockwise to move synchronizer through neutral and into engagement with gear 27. The drive for third speed is then from drive shaft 10, ring-gear 12, planet gears 23, planet gear carrier 24, intermediate shaft 25, through synchronizer 35 to driven shaft 32.

For fourth speed, synchronizer 35 remains connected to gear 27, and section B is locked up in one-to-one ratio as for second speed. With said section B locked up and with synchronizer 35 connecting gear 27 directly to shaft 32, intermediate shaft 25 rotates at the same speed as drive shaft 10, and driven shaft 32 rotates at the same speed as intermediate shaft 25 or drive shaft 10.

Neutral may be obtained either by placing synchronizer 35 in a position intermediate its extreme positions, or by leaving synchronizer in either one of its extreme positions and releasing both clutch disc 14 and brake 26. Obviously with brake 26 released and disc 14 likewise released, there is no reaction member to sustain the driving action of ring-gear 12, and accordingly sun-gear 22 will simply rotate and dissipate all the torque in ring-gear 12.

For reverse, synchronizer 35 is placed in its intermediate position, that is, in its neutral position, and gear 34 is slid to the right (Fig. 6) into engagement with idler 33. Two speeds in reverse may thus be obtained by using the reduction through section B, or by locking section B in one-to-one.

Referring now to Fig. 4 for the details of the brake mechanism, brake band 26 is provided with arcuate terminals 43 and 44 having radial flanges 45 and 46 respectively. Between said flanges 45 and 46 is a coil spring 47 which tends to spread said terminals apart, thereby to release brake band 26. Terminal 43 is anchored against adjustable screw 48, leaving terminal 44 free to move circumferentially. A rock shaft 49 is provided having an eccentric socket 50 rotatable therewith. Radial flange 46 of terminal 44 is provided with a similar socket 51, and between sockets 50 and 51 and cooperating therewith is a pin 52. Rock shaft 49 is rigidly connected to a bell crank 53, one arm 54 of which is connected to coil spring 55 as shown in Fig. 5. Said connection comprises a rod 56 having a nut 57 threaded thereon to support a plate 58. Said spring 55 is adapted to be compressed between plate 58 and a plate 59, which is fixed with respect to the housing 60 of the transmission. Since arm 54 and socket 50 are on opposite sides of rock shaft 49, it will be apparent that spring 55 normally tends to rotate socket 50 clockwise about rock shaft 49 thereby causing pin 52 to move upward. This upward movement of pin 52 causes terminal 44 to be drawn toward the opposite terminal 43, thereby to tighten brake band 26 and stop the rotation of sun-gear 22.

Concentric with clutch rock shaft 20 is a sleeve 62 having an arm 63 rotatable therewith. The second arm 61 of bell crank 53 is connected to arm 63 through a link 64, so that movement of bell crank 53 is transmitted to sleeve 62 through arms 61 and 63 and link 64. Synchronizer rock shaft 39 and reverse gear rock shaft 42 are provided with arms 65 and 66 respectively, which are rotatable with said shaft. Thus, the external control for the clutch is rock shaft 20, the external control for brake band 26 is sleeve 62 and the external controls for synchronizer 35 and reverse gear 34 are arms 65 and 66 respectively.

The means used to actuate the above external controls and to coordinate such action will now be described.

Referring now to Figs. 1 and 2, one of the controls mentioned above is either operated by, or its operation is controlled by, a lever 67 mounted on steering column 68 under steering wheel 69. It is understood, of course, that this location of lever 67 is the preferred location, and that said lever 67 may, if desired, be located at some other place in the vehicle. Lever 67 is capable of moving through a quadrant in the plane of steering wheel 69, and is also capable of moving upward and then parallel to the first plane of movement over a fraction of the previous quadrant. This movement is shown in end elevation schematically in Fig. 2, and follows somewhat the movement of a conventional gear shift lever. The upper quadrant is used for reverse only, while the lower quadrant is used to shift to the various speeds and neutral as indicated. It will be noted that first and second speeds are obtained from a single position of lever 67, and likewise third and fourth speeds are obtained from a single position of said lever but at a different point in the quadrant. Neutral is obtained at a point intermediate the two positions just described. The means by which two different speeds may be obtained from a single position of lever 67 will be described hereinafter.

Connecting lever 67 and the controls shown on Fig. 5 is the mechanism disclosed in Figs. 1 and 3. It is contemplated by this invention that synchronizer 35 and reverse gear 34 will be controlled manually and that brake 26 and clutch disc 14 will be power-operated with a manual over-control.

Starting from reverse arm 66, said arm is connected to a bent rod 74, which in turn is connected to hollow shaft 71 through an arm 72 rigidly secured to hollow shaft 71. Hollow shaft 71 is secured to steering post 68 by means of a bracket 73, and extends upward to the region of control lever 67. Synchronizer arm 65 is connected through a similar bent rod 70 and an arm 75 to a shaft 76 within hollow shaft 71. Said shaft 76 likewise extends upward into the region of the control lever 67. Suitable mechanism (Figs. 2, 7 and 8) may be used at the upper end of shafts 71 and 76, whereby lever 67 may be selectively connected to either shaft so that either shaft may be driven by lever 67. This mechanism is enclosed in a casing 109 secured to steering post 68 and comprises spaced arcuate lugs 110 and 111 on shafts 76 and 71 respectively between which is an extension 112 on control lever 67. Said control lever is pivotally mounted at 113 on a loose collar 114 surrounding hollow shaft 71. Vertical movement of said control lever 67 causes extension 112 to engage slot 115 in lug 110 or slot 116 in lug 111 as the case may be and thereby permit the lever to drive either shaft 76 or shaft 71. A conventional poppet type interlocking mechanism 117 may be provided to maintain the disengaged shaft in neutral while the engaged shaft is driven. Thus, when lever 67 is connected drivingly to shaft 76, movement of said lever 67 counter-clockwise will cause rod 70 to be drawn to the left (Fig. 1) thereby conditioning the counter-shaft transmission for reduced ratio drive therethrough. When control lever 67 is in the position shown in Fig. 2, rod 70 will cause synchronizer 35 to assume a neutral position, and when said lever 67 is moved downward to the dot-and-dash position shown in Fig. 2, said rod 70 will rotate lever 65 counter-clockwise and condition synchronizer 35 for direct drive through the transmission in section C.

Lever 67 when in neutral may be raised to its second plane of movement and then moved counter-clockwise to a position above the reduced drive position, thereby picking up shaft 71 through lug 111 and rotating it to exert a pull on bent rod 74. When said bent rod 74 is pulled to the left (Fig. 1), gear 34 will be meshed with reverse idler 33 as described above to give a reverse drive.

Continuing with the description of the external controls for the shiftable elements, it will be noted that clutch disc 14 and brake band 26 are normally biased to operative positions by springs 15 and 55 respectively so that the shift in sections A and B may be effected by counteracting said spring pressures. It is apparent from Fig. 5 that the controls for each of these shiftable elements are rotated counter-clockwise to effect a release of said elements. The means used to operate sleeve 62 and shift 20 is a double-acting vacuum cylinder 107, the pressure within which is controlled by a valve 108 which in turn is controlled by a solenoid 77. Valve 108 is a simple piston valve of the type which is used with double acting, fluid operated motors such as double acting steam engines, and has lands and ports arranged alternately to exhaust one side of the piston when the other is subjected to pressure. A resilient member 108' normally holds valve 108 in one position, and solenoid 77, when energized, pulls the valve to the opposite position against the action of resilient member 108'. The electrical connections 78 and 79 to solenoid 77 pass through steering post 68 and control lever arm 67 to a two-position switch 80 at the end of arm 67. Said switch 80 may be of any suitable form, the one shown being pivoted on an axis parallel to the axis of steering post 68. The switch, however, may also be pivoted on an axis parallel to the axis of control arm 67 if such form is found to be more desirable. When said switch is in the position shown in Fig. 2, the piston 81 in cylinder 107 is forced downward (Fig. 1) and when said switch 80 is in the dotted position shown in Fig. 2, the piston 81 in cylinder 107 is forced upward. Piston rod 82 is connected through a connecting rod 83 to one arm 84 of a three-arm bell crank 85. Arm 86 of bell crank 85 is connected through a lever 87 to an arm 88 which is rotatable with clutch shaft 20. Arm 89 of bell crank 85 is connected through lever 90 to an arm 91 which is rotatable with sleeve 62. It will be recalled that sleeve 62 is the operating member for brake band 26.

As bell crank 85 is rotated from one of its extreme positions to the other, one of its arms, 86 or 89 as the case may be, approaches dead-center relation with respect to its cooperating connecting link, thereby increasing the distance between the end of such link and the axis about which said bell crank 85 rotates. Arms 88 and 91 are connected to links 87 and 90 respectively by pin and slot connections 92, 93 and 94, 95. Increasing the distance between the ends of said connecting links and the axis of rotation of bell crank 85, therefore serves to rotate arms 88 and 91 and the shaft and sleeve connected thereto respectively. In this manner a double-acting cylinder can be made to rotate shaft 20 and sleeve 62 in opposite directions with each stroke. It will be noted that by rotating shaft 20 and sleeve 62 in opposite directions, one is assisting cylinder 107 while the other is opposing said cylinder. This opposition persists until a dead-center relation is reached between the arm and connecting link of the opposing elements. Obviously, such opposition must be balanced by the power in cylinder 107, and if this power fluctuates or for any reason becomes extinguished, then the opposing element will succeed in returning partly or completely to its operative position, and would thereby effect a shift which is entirely uncontrolled.

According to this invention, an uncontrolled shift is rendered impossible by causing said arms 86 and 89 to be rotated slightly past dead-center so that both shiftable elements, that is, the clutch and the brake, act in the same direction in the final stage of the shift. Thus, power is utilized merely to rotate the releasing arm past dead-center and thereafter said releasing arm will be held in place regardless of fluctuations in, or a total cessation of, power in cylinder 107.

Although neutral may be obtained by suitably positioning synchronizer arm 65, it may be desirable, partly because of the driving habits of the public and partly to assist synchronizer 35 in making its shift, to provide an additional means for securing a neutral condition in the transmission. This may be accomplished, as stated above, by releasing simultaneously brake band 26 and clutch disc 14. Translated into movements of clutch shaft 20 and brake sleeve 62, such neutral may be obtained by simultaneously rotating said shaft 20 and sleeve 62 in a counter-clockwise direction to the limits of movement permitted in that direction. Accordingly, a clutch pedal 96 is provided, which is pivoted about an axle 97 mounted on frame member 98. Said pedal 96 is connected through a conventional parallelogram linkage to a collar 99 rotatably mounted on clutch shaft 20 between arms 88 and 91. Said collar 99 is provided with a pair of lugs 100, 101, having adjusting screws 102, 103, respectively, threaded therein. Opposite arms 88 and 91, and rotatable therewith, are extensions 104 and 105 respectively, which extend into the path of movement of adjusting screws 102 and 103.

When pedal 96 is depressed, said collar 99 will be rotated counter-clockwise, and with it will be rotated adjusting screws 102 and 103. Whichever arm 88 or 91 is in a position corresponding to an operative position of clutch shaft 20 and brake sleeve 62, that arm will be rotated with said collar 99 by contact with the adjusting screws on extensions 104 and 105. Since the clutch or the brake is always released when the other is engaged and vice versa, to secure neutral it is only necessary to release the engaged element. If, however, for any reason, power fails before one of the arms has passed dead-center so that neither clutch nor brake is fully engaged or fully disengaged, clutch pedal 96 may be depressed to rotate both to a neutral position, thereby permitting manipulation of synchronizer 35 to disconnect the driven shaft from the transmission.

The reason for the pin and slot connections 92, 93 and 94, 95 between links 87 and 90 and their respective arms 88 and 91 is now obvious. Neutral may be obtained by depressing clutch pedal 96 without disturbing arm 67 or switch 80 located thereon and without requiring any movement of bell crank 85 and its associated power mechanism.

The sequence of operation to effect a shift from neutral to high speed with the control mechanism and transmission illustrated is as follows:

First is obtained by depressing pedal 96 to relieve the various elements of synchronizer 35 of driving torque, and control arm 67 is moved counter-clockwise along the lower quadrant to the dot-and-dash position shown in Fig. 2. Switch 80 is turned counter-clockwise to its upper position, and pedal 96 is then released. Clutch disc 14 will be released, brake 26 will be engaged, and gear 31 will be connected to output shaft 32, thereby giving a reduction in both units of the transmission.

To shift from first to second all that is necessary is to rotate switch 80 clockwise to its lower position without touching any of the other controls. This will move piston 81 to the opposite end of cylinder 107 and thereby disengage brake band 26 and engage friction disc 14 to give a one-to-one ratio to the planetary. With synchronizer 35 remaining in its previous position, this will give the next higher speed reduction through the transmission.

To shift from second to third speed, pedal 96 is again depressed, and control lever 67 is moved downward in the same quadrant to its other extreme position. Switch 80 is likewise moved back to its upper position and pedal 96 is then released. With switch 80 in its upper position, brake band 26 is again engaged and clutch disc 14 is disengaged as for first speed, but movement of control lever 67 to its opposite extreme position has caused synchronizer 35 to connect gear 27 directly to output shaft 32. Thus, the countershaft portion of the transmission is connected in one-to-one ratio, but the planetary portion is connected for reduced drive, and the next highest or third speed is therefore effective.

The shift from third to fourth or direct is effected simply by moving switch 80 to its lower position as in the case of second speed without moving any of the other controls. This again causes piston 81 to be moved to the opposite end of cylinder 107 and thereby to release brake band 26 and engage clutch disc 14 to condition the planetary gear set for direct drive.

Reverse is obtained by depressing clutch pedal 96 and shifting control lever 67 across to its upper plane of movement and then up in said upper plane to its extreme position therein. Pedal 96 is then released and switch 80 may be placed in either one of its positions depending upon the amount of power desired in reverse. For more power, switch 80 is left in its upper position and if less power is desired switch 80 may be moved to its lower position.

It will be apparent now from the foregoing that the control described will give four forward speeds, neutral and two reverse speeds with but a single control lever and a single switch to be manipulated by the operator and that regardless of the setting of said control lever or switch, the transmission may be placed instantly in neutral position by the over-control pedal 96. The operation of said pedal 96 is exactly the same as the present clutch pedal, so that no new technique will be necessary on the part of the operator to throw the vehicle out of gear. The control just described will prevent the transmission from making an uncontrolled shift such as would occur should the power fluctuate or cease entirely, or in the event that the vehicle is severely jarred. Reciprocating movement of the power member is translated by the control mechanism into movement in opposite directions of two of the shiftable elements of the transmission, so that mutually exclusive operation of said elements is possible. It will be noted also that the control mechanism is such as to cause the movement of the shiftable elements to become slower as the elements approach engaged position, so as to avoid jerky operation.

It is understood that the foregoing description is merely illustrative of a preferred embodiment of the invention, and that the scope of the invention, therefore, is not to be limited thereto, but is to be determined by the appended claims.

I claim:

1. A control for a transmission, said transmission having two mutually exclusively operable members, said control comprising a pivoted lever for each member, a three-armed bell crank rotatable about a separate pivot, power means connected to one arm of said bell crank, links connecting the other arms with the pivoted levers through a lost-motion connection, whereby rotating said bell crank by said power means causes such mutually exclusive operation of said members, and means acting on said pivoted levers to release whichever member is operated regardless of the position of said bell crank.

2. A control for a transmission, said transmission having two mutually exclusively operable members, means urging said members to operative position, power means for selectively rendering said members inoperative, lever and link means connecting said power means and said members, a lost motion connection in said lever means, and unitary manual means acting through said lost motion connection for rendering inoperative the member rendered operative by the urging means.

3. A control for a transmission as described in claim 2, said lever and link means including a bell crank having one arm connected to the power means and one arm for each member, said member arms being at such angles to the power arm as to cause one link means to be nearer dead-center position with respect to its cooperating arm than the other link means in any operative position of the power means whereby to effect mutually exclusive operation of said members.

4. A control for a transmission, said transmission having two mutually exclusively operable members, means simultaneously urging said members to operative position, power means for selectively urging said members to inoperative position, and lever and link means connecting said power means and said members, whereby to effect such mutually exclusive operation of the members by the power means, said lever and link means bearing an over-center relation to one another after said power means is operated, to render said transmission independent of fluctuations in the power of said power means.

5. A control for a transmission, said transmission having two mutually exclusively operable members, means simultaneously urging said members to operative position, power means for selectively urging said members to inoperative position, and means intermediate said power means and said members for effecting such mutually exclusive operation of said members, said last mentioned means being effective to maintain either member in inoperative position regardless of fluctuations in the power of said power means.

6. A control for a transmission, said transmission having two mutually exclusively operable members, means simultaneously urging said members to operative position, power means for selectively urging said members to inoperative position and means intermediate said power means and said members for effecting such mutually exclusive operation, said last mentioned means being effective to maintain either member in inoperative position independently of said power means after such member has been caused to assume its inoperative position.

7. A control for a transmission as described in claim 6, and means independent of said power means for rendering both members inoperative.

8. A control for a transmission, said transmission having two mutually exclusively operable members, individual means simultaneously urging said members to operative position, power means for selectively urging said members to inoperative position against said individual means, and means intermediate said power means and said individual means for effecting such exclusive operation, one of said individual means being adapted in the initial stage of the operation of the power means to oppose the movement of said power means, and both of said individual means being adapted to aid said power means in the final stage of movement of said power means, said power means acting as a stop for one of said individual means to prevent simultaneous operation of said members.

9. A control for a transmission, said transmission having two mutally exclusively operable members, means simultaneously urging said members to operative position, power means for selectively urging said members to inoperative position and means intermediate said power means and said members for effecting such mutually exclusive operation of said members, said intermediate means being capable of converting constant linear velocity into variable linear velocity whereby to effect a gradual operation of said members.

10. A control for a transmission as described in claim 9, said intermediate means comprising a three-armed bell crank, one arm being connected to the power means, and links connecting each of the other arms to the members, the other arms being so located with respect to the links connected therewith to cause said links to approach dead-center position with respect to said arms when the member connected thereto is caused to assume its inoperative position.

11. A control for a transmission, said transmission having a plurality of shiftable elements at least two of which are mutually exclusively operable, a pivoted lever, electrically controlled power means for said mutually exclusively operable elements, means intermediate said shiftable elements and said lever and power means whereby to effect a shift of said elements by said lever and power means, said intermediate means including a three-armed bell crank, links and lost motion connections, for operating the mutually exclusively operable elements, one arm of said crank being connected to the power means, and the other arms being connected to said links, said arms and links approaching a dead-center relation as the elements associated therewith become operative whereby to secure a smooth shift, a second lever adapted by said lost motion connections to control independently of the power means the elements permitted by the power means to be shifted, and an electric switch on said first lever to control the electrically controlled power means.

12. A control for a transmission as described in claim 11, said arms and links being operable during the first stage of the movement of said power means to oppose such movement and during the last stage of movement being operable to assist such movement.

13. A control for a transmission as described in claim 11, said mutually exclusively operable elements being independent of said power means after said elements have been shifted by said power means.

BENJAMIN A. SWENNES.